US006934853B2

(12) United States Patent
Christopherson et al.

(10) Patent No.: US 6,934,853 B2
(45) Date of Patent: Aug. 23, 2005

(54) METHOD, SYSTEM AND PROGRAM FOR SHARING THE ABILITY TO SET CONFIGURATION PARAMETERS IN A NETWORK ENVIRONMENT

(75) Inventors: Thomas Dean Christopherson, Rochester, MN (US); Pernell James Dykes, Byron, MN (US); Scott Hammersley, Sartell, MN (US); Harvey Gene Kiel, Rochester, MN (US); Christopher John Lankow, Rochester, MN (US); Raymond Francis Romon, Oronoco, MN (US); Timothy James Slavin, St. Michael, MN (US)

(73) Assignee: International Business Machines Corporation, Armonk, NY (US)

( * ) Notice: Subject to any disclaimer, the term of this patent is extended or adjusted under 35 U.S.C. 154(b) by 838 days.

(21) Appl. No.: 09/764,694

(22) Filed: Jan. 18, 2001

(65) Prior Publication Data

US 2002/0095595 A1 Jul. 18, 2002

(51) Int. Cl.[7] .......................... G06F 11/30; G06F 12/14; H04L 9/00; H04L 9/32
(52) U.S. Cl. ............................. 713/200; 713/1; 713/2; 713/201; 707/9; 709/223; 709/225; 709/228
(58) Field of Search ................................. 713/1, 2, 200, 713/201, 164; 707/9, 102; 709/223, 225, 228, 220, 221, 222

(56) References Cited

U.S. PATENT DOCUMENTS

| | | | | |
|---|---|---|---|---|
| 5,778,365 A | * | 7/1998 | Nishiyama | 707/9 |
| 5,889,952 A | * | 3/1999 | Hunnicutt et al. | 709/219 |
| 6,026,438 A | * | 2/2000 | Piazza et al. | 709/221 |
| 6,066,182 A | * | 5/2000 | Wilde et al. | 709/222 |
| 6,096,094 A | * | 8/2000 | Kay et al. | 717/168 |
| 6,128,730 A | * | 10/2000 | Levine | 713/1 |
| 6,170,008 B1 | * | 1/2001 | Bahlmann et al. | 709/220 |
| 6,256,635 B1 | * | 7/2001 | Arrouye et al. | 707/102 |
| 6,449,642 B2 | * | 9/2002 | Bourke-Dunphy et al. | 709/222 |
| 6,466,972 B1 | * | 10/2002 | Paul et al. | 709/222 |

OTHER PUBLICATIONS

K. McCloghrie et al., "Management Informaton Base for Network Management", RFC 1213, Mar. 1991, pp. 1–66.
R. Smith et al., "Printer MIB", RFC 1759, Mar. 1995, pp. 1–106.
Yoram Cohen, "SNMP—Simple Network Management Protocol", [online] pp. 1–12. Retrieved on May 1, 2001. [Retrieved from the Internet at <URL: http://www.snmp.com>].
IBM Corp., "NetVista Thin Client Express Service Utility", Jul. 2000, pp. 1–41.

(Continued)

Primary Examiner—Kim Vu
Assistant Examiner—Beemnet Dada
(74) Attorney, Agent, or Firm—Konrad Raynes & Victor, LLP

(57) ABSTRACT

Provided is a method, system, program, and data structures method, system, program, and data structures for configuring a client computer connected to a network, wherein a remote computer is capable of communicating with the client computer over the network. Sets of configuration parameters are stored in a non-volatile storage unit. The sets of configuration parameters instruct at least one program how to initialize operational parameters and load programs into the client computer memory during a power on. For each set of configuration parameters, a token is stored in the non-volatile storage unit indicating access rights to the set of configuration parameters. The token specifies whether management entities running on the remote computer and client computer can access the set of configuration parameters for that token.

48 Claims, 4 Drawing Sheets

OTHER PUBLICATIONS

IBM Corp., "N2200 Thin Client Reference", IBM Doc No. A23–2804–00, Jul. 2000, pp. i–52. [May be retrieved from the Internet at URL: <http://www.ibm.com/nc/pubs].

IBM Corp., "N2200e Thin Client Express Reference", IBM Doc No. SA23–2803–01, Sep. 2000, pp. i–66.

IBM Corp., "IBM NetVista Thin Client N2200w Windows–based Terminal", Jul. 2000, pp. 1–19.

IBM Corp., "IBM NetVista N2200e, Thin Client Express", Sep. 2000, pp. 1–2.

SNMP, "SNMP Access Policies", [online] pp. 1, retrieved on May 1, 2001. Retrieved from the Internet at <URL:http://www.snmp.com>.

IBM Corp., "IBM Network Station Manager V2R1", IBM Doc No. SG24–5844–00, Apr. 2000, pp. i–194 and 353–386.

* cited by examiner

METHOD, SYSTEM AND PROGRAM FOR SHARING THE ABILITY TO SET CONFIGURATION PARAMETERS IN A NETWORK ENVIRONMENT

BACKGROUND OF THE INVENTION

1. Field of the Invention

The present invention relates to a method, system and program for sharing the ability to set configuration parameters in a network environment between a client computer and network.

2. Description of the Related Art

Personal computers and workstations have become standard work tools in most office environments. To further improve the usefulness of the computer systems, most office computer systems have been linked together into an office Local Area Network (LAN). The Local Area Network allows the computer users at different computer systems to easily share information with each other. The network also allows the computer users to share computer hardware such as printers and modems. Many networks include a network administrator server that manages shared resources in the network. One issue that must be addressed is how a network administrator managing the LAN will configure individual client computers.

In certain network environments, the network administrator will have full control over setting parameters at the client computers to the exclusion of the user of the client computer. Alternatively, the network may be configured to allow individual client users to configure operational parameters. However, certain parameters are more appropriately set by the network administrator to the exclusion of the individual user, such as providing network addresses and parameters to the client to allow the client to communicate over the network and utilize network devices, such as printers and network storage space. Alternatively, other parameters, such as local user interface settings are more appropriately left to the client user to configure.

In the prior art, to allow both the user of the client computer and network administrator control to configure settings, the network administrator will physically go to the client computer and set certain network address settings locally at the client computer, leaving other configuration parameters for the client computer user to set. This approach is problematic because it requires that a network administrator take the time to visit to the location of the client computer to enter certain settings.

For these reasons, there is a need in the art for an improved technique for determining the level of control over setting configuration parameters by client computer users and network administrators.

SUMMARY OF THE PREFERRED EMBODIMENTS

Preferred embodiments describe a method, system, and program for configuring a client computer connected to a network, wherein a remote computer is capable of communicating with the client computer over the network. Sets of configuration parameters are stored in a non-volatile storage unit. The sets of configuration parameters instruct at least one program how to initialize operational parameters and load programs into the client computer memory during a power on. For each set of configuration parameters, a token is stored in the non-volatile storage unit indicating access rights to the set of configuration parameters. The token specifies whether management entities running on the remote computer and client computer can access the set of configuration parameters for that token.

In further embodiments, each token specifies at least one management entity. In such case, only the management entity specified in the token has access rights to the set of configuration parameters associated with that token. At least one token specifies one management entity at the client computer and at least one other token specifies one management entity at the remote computer.

In still further embodiments, the client computer and remote computer are capable of modifying the access rights specified in the token if the access rights permit the client computer or remote computer requesting the modification write access to the set of configuration parameters. In such case, modifications from the client computer or remote computer to the access rights specified in the token for one set of configuration parameters are stored in the non-volatile storage unit. The modifications are made to the token if the client computer or remote computer initiating the modifications is indicated in the access rights as having write access.

In yet further embodiments, the sets of configuration parameters associated with the tokens may include network configuration parameters indicating network settings the computer uses to communicate over the network; operating system configuration parameters for an operating system loaded into the computer memory; application configuration parameters indicating parameters for application programs loaded into the computer memory; user configuration parameters indicating settings for a user interface displayed at the client computer; and Simple Network Management Protocol (SNMP) configuration parameters.

Preferred embodiments provide a technique for sharing the ability to configure parameters at a client computer between a local application and a remote network administrator. In this way, the remote computer can take control of setting certain network configuration parameters and allow a user at the client computer to retain the ability to configure parameters that do not affect the network, such as operating system, local application program and user interface settings. Moreover, in some cases, individual users should not be allowed access or control over network parameters. In this respect, preferred embodiments allow a remote administrator to grant some control but not others to a local user without having to visit the client computer.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
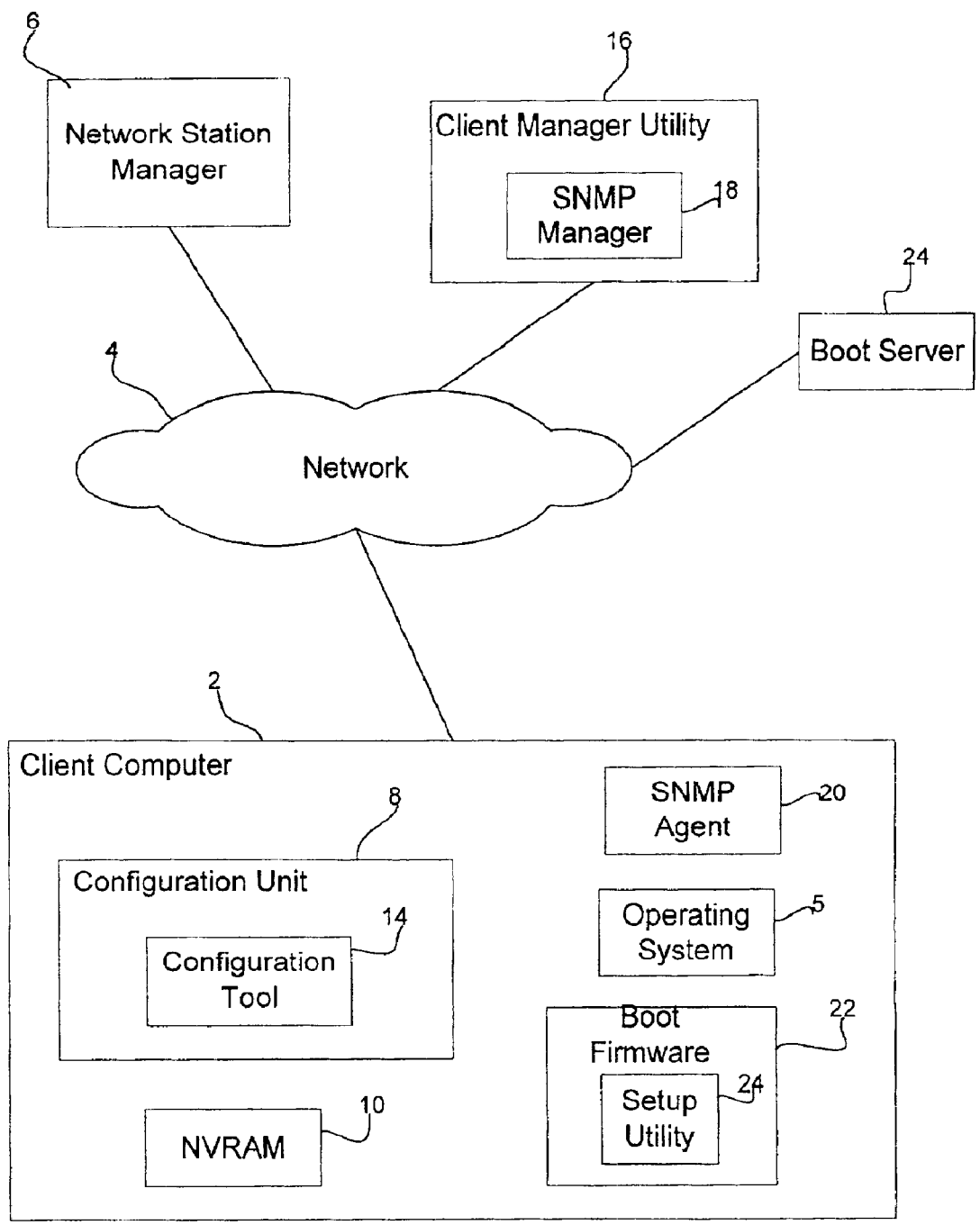
FIG. 1 is a block diagram illustrating a computing environment in accordance with preferred embodiments of the present invention.

FIG. 1 illustrates a computing environment in which preferred embodiments of the present invention are implemented. One or more client computers 2 are connected to a network 4, such as a local area network (LAN), intranet, Ethernet, WAN, System Area Network (SAN), Token Ring, LocalTalk, TCP/IP, the Internet, etc. A network station manager 6 is capable of configuring the client computers 2 over the network 4.

The client computer 2 includes standard computer components, such as central processing unit (CPU), memory, storage, device bus, network adaptor, etc. (not shown), an operating system 5, as well as a configuration unit 8. The configuration unit 8 comprises a removable nonvolatile memory device, such as a compact flash card that connects to an interface on the client computer 2 motherboard, a PCMCIA card (Personal Computer Memory Card International Association) that communicates through a peripheral component interconnect (PCI) card, or any other removable non-volatile storage device known in the art. If the configuration unit 8 is a compact flash card, then the client computer 2 motherboard (not shown) would include grooves into which the compact flash card may be removed and inserted in a manner known in the art. The configuration unit 8 includes a configuration tool 14 that is used to configure parameters The client computer 2 further includes a non-volatile random access memory (NVRAM), such as a battery-backed up random access memory (RAM) or any other non-volatile storage unit that stores configuration information between power off and power on. The NVRAM 10 may be a portion of the memory used by the client computer 2 CPU.

The network station manager 6 is capable of managing and configuring settings on client computers 2.

A client manager utility system 16 includes a Simple Network Management Protocol (SNMP) manager 18 to perform SNMP manager operations on the client computer 2 through an SNMP agent 20 at the client computer 2. SNMP is a standardized protocol for sending network management commands to network devices and receiving status information from the network devices.

In preferred embodiments, the client manager utility 16, including the SNMP manager 20, is implemented on a separate hardware platform from the network station manager 6. The client manager utility 16 deals principally with SNMP and network parameters, whereas the network station manger 6 handles user preferences, application/desktop mixes and other system parameters separate from SNMP. However, in alternative embodiments, the network station manager 6 functions and client manager utility 16 and SNMP functions may be implemented in the same remote computer.

The boot firmware 22 included in the client computer 2 performs initialization operations during a power on routine, such as a power on self test (POST). The boot firmware 22 includes a setup utility 24 used during initial setup operations. Both the setup utility 24 and configuration tool 14 access the NVRAM when performing configuration operations to control access to configurable settings in the client computer 2. The boot firmware 22 may be maintained in a separate non-volatile memory device, such as a programmable read only memory (PROM), on the client computer 2 motherboard.

Figure 2:
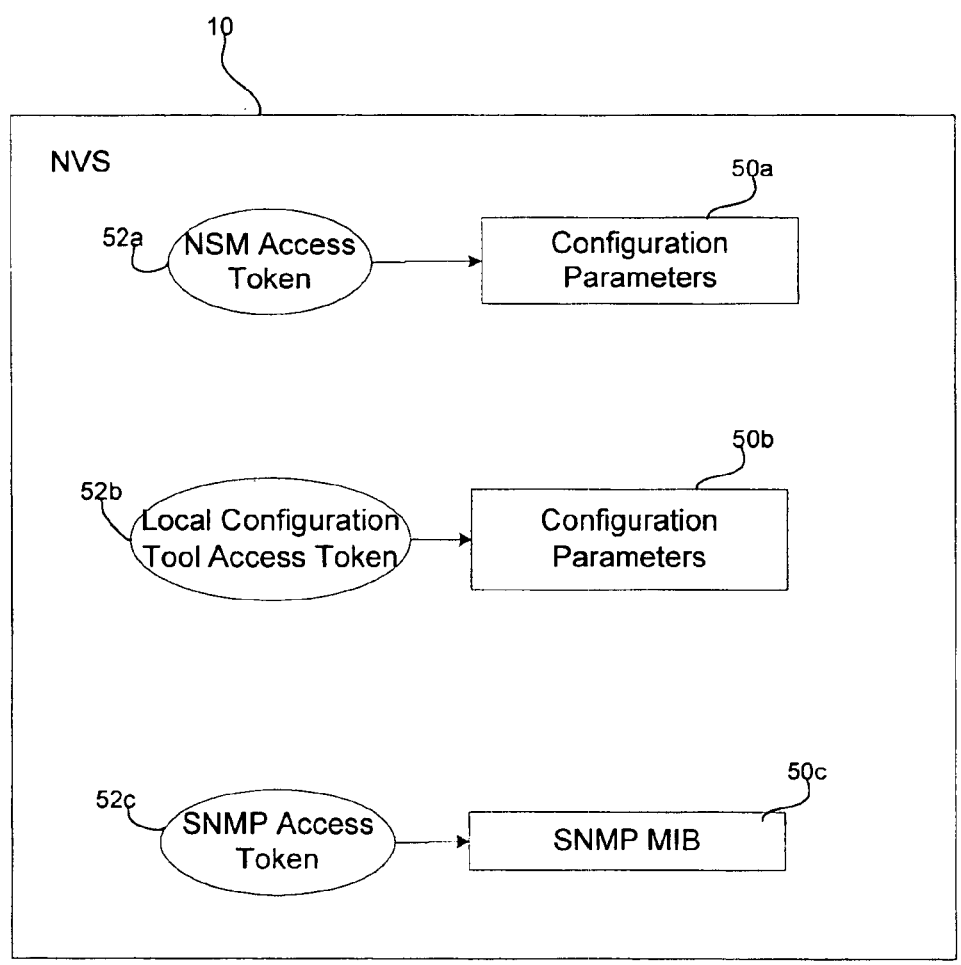
FIG. 2 illustrates configuration parameters and tokens maintained in a non-volatile memory in accordance with preferred embodiments of the present invention.

FIG. 2 illustrates access tokens maintained in the NVRAM 10 that are used to indicate which management entities are allowed read/write access to configuration parameters at the client computer 2. The tokens include a network station manager (NSM) access token 52a, a local configuration tool access token 52b, and an SNMP access token 52c. A "management entity" comprises any program, process, thread, system, computer or other computational entity capable of managing and configuring configuration parameters. The SNMP access token 52b provides the SNMP manager 18 at the client manager utility 16 read/write access to a SNMP management information base (MIB). The MIB comprises a managed object database including definitions, such as network or printer parameters, that the agent queries and modifies in response to commands from an authorized manager program.

The NSM 52a and configuration tool 52b access tokens provide the network station manager 6 and configuration tool 14 read/write access, respectively, to their respective set of configuration parameters 50a, b. The sets of configuration parameters 50a, b may be overlapping, thereby allowing both the network station manager 6 and configuration tool 14 access to configure the same set of configuration parameters.

The tokens 52a, b, c may also specify the application permitted to modify configuration parameters 50a, b, c, such as the client configuration tool 14. In preferred embodiments, a user at the client computer 2 or a remote network station manager 6 could obtain write access to change the access settings indicated in the access tokens 52a, b, c to exclude or allow others access to particular configuration settings 50a, b, c. The settings may include an administrator password that is required in order to use the configuration tool 14.

The sets of configuration parameters 52a, b associated with the tokens 50a, b may include the following types of configuration parameters:

Network Configuration Parameters: These parameters may specify a network address, e.g., internet protocol (IP) address, for the client or provide the address of a Dynamic Host Configuration Protocol (DHCP) server that provides a network address to the client computer 2 during initialization.

Operating System Configuration parameters: these parameters indicate to load an operating system kernel from the configuration unit 8 or specify a network address of a boot server on the network 4 from which an operating system kernel can be downloaded. The parameters may further specify operating system configuration parameters to use when loading the operating system into the client computer 2 memory that affect operating system operations.

Application Configuration parameters: indicate applications to load from a server over the network 4 or the configuration unit 8. These parameters 50c can further specify configuration parameters for specific applications once they are loaded into the client computer 2 memory, such as emulators to control remote hosts, an Internet browser such as Netscape**, advanced diagnostic settings, etc.

**JAZ and ZIP are registered trademarks of Iomega Corpoation.

User Configuration parameters: indicate parameters for user interface controls independent of applications, such as mouse orientation, tool bar display, desktop arrangement, etc.

Figure 3:
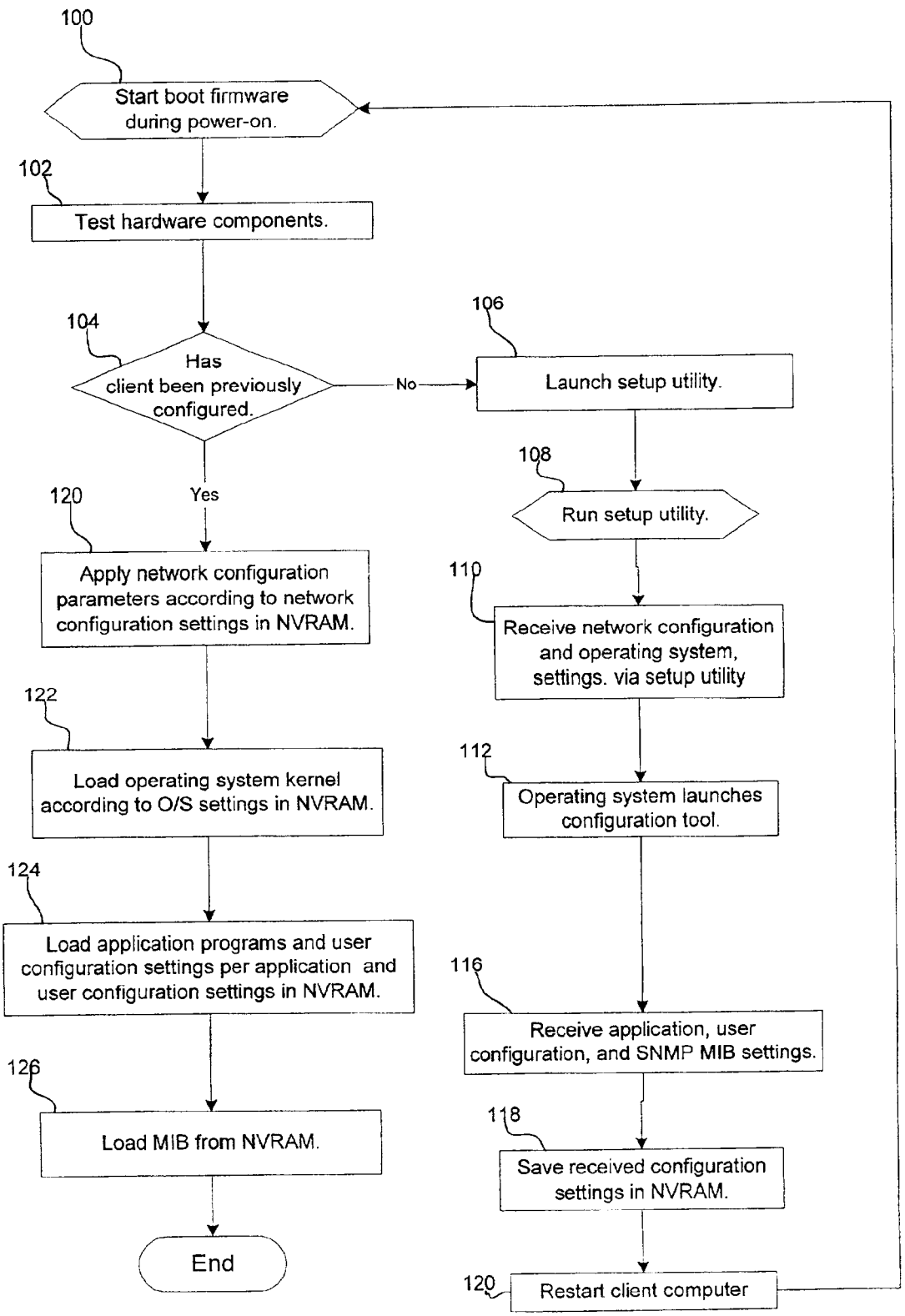
FIGS. 3 and 4 illustrate logic to configure system parameters in accordance with preferred embodiments of the present invention.

FIG. 3 illustrates logic implemented in the boot firmware 22 to perform an initialization routine during a power on at block 100. The boot firmware 22 initially tests (at block 102) the hardware components of the client computer 2 in a manner known in the art. If (at block 104) the client has not previously been configured, then the boot firmware 22 launches (at block 106) the setup utility 24. The boot firmware 22 can determine whether the client computer 2 has previously been configured by checking a parameter in the NVRAM 10 indicating whether configuration has occurred or the checking whether settings in the NVRAM 10 are the factory default settings. When running (at block 108), the setup utility 24 can receive (at block 110) network and operating system configuration settings through an interactive user interface displayed by the setup utility 24. Upon completing the initialization of network and operating system settings, the setup utility 24 would launch (at block 112) the operating system 5, which in turn launches the configuration tool 14. When running, the configuration tool 14 can receive (at block 116) application, user interface, and SNMP MIB settings providing configuration variables and/or setting access levels. The user through the configuration tool 14 can then save (at block 118) the settings entered via the configuration tool 14 interactive interface in the NVRAM 10. After initial configuration settings are saved, the client computer 2 restarts (at block 120) to use the configured settings stored in the NVRAM 10.

If (at block 104) the client computer 2 has previously been configured, then the boot firmware 22 applies (at block 120) the network configuration parameters stored in the NVRAM 10. For instance, the boot firmware 22 can set the network address to an IP address provided with network configuration settings or, if the network configuration settings indicate DHCP, request a network address to use from a remote DHCP server (not shown) over the network 4. The boot firmware 22 then loads (at block 122) the operating system kernel 5 according to the operating system configuration parameters stored in the NVRAM 10. The operating system parameters may specify to load the operating system kernel 5 from the configuration unit 8 or access a remote boot server 24 (FIG. 1) over the network 4 from which the operating system kernel 5 can be downloaded and loaded. The operating system 5 would then load application programs (at block 124) according to the application configuration parameters in the NVRAM 10, including any specified parameters, and user configuration settings also stored in the NVRAM 10. If applicable, the operating system 5 or SNMP agent 20 would further load (at block 126) the MIB maintained in the NVRAM 10 into the client computer 2 memory for use by remote managers. The client computer 2 is then up and running upon completion of loading all configuration parameters specified in the NVRAM 10.

With the preferred logic of FIG. 3, all necessary configuration parameters used to configure the client computer 2 is maintained on the configuration unit 8 and the NVRAM of the client computer 2. The configuration unit 8 provides the programs needed to locally set and modify the client computer 2 configuration.

Figure 4:
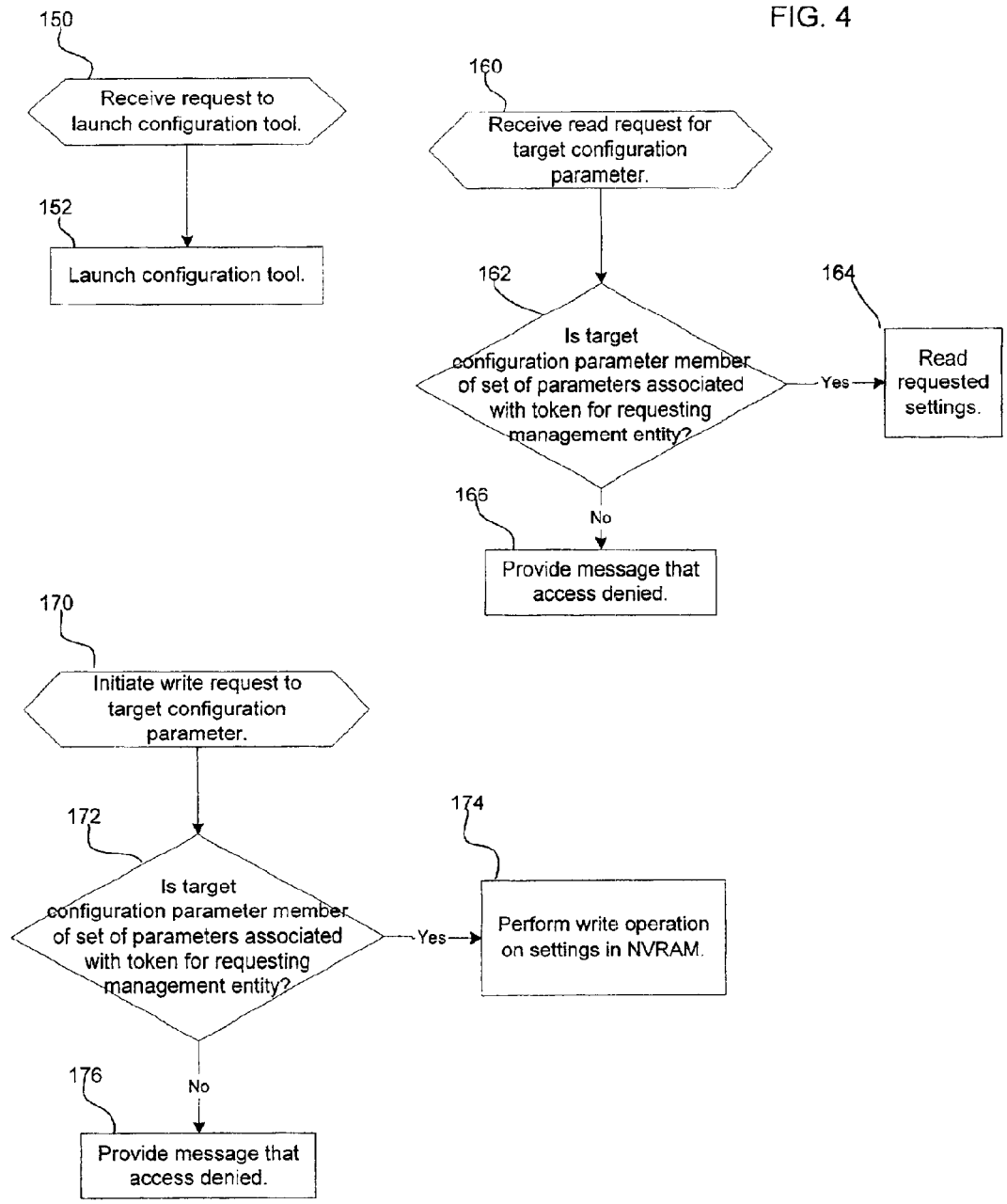

FIG. 4 illustrates logic to alter configuration settings after the computer has initialized. At block 150, the operating system 5 of the client computer 2 receives a request to launch the configuration tool 150. This request may be invoked by simultaneously pressing a set of keys, e.g., Shift+Ctrl+Alt. In response, the configuration tool 150 is launched (at block 152). If some entity had previously specified a password to use when accessing the configuration tool 12, then the user would have to provide the previously created password which is stored in the NVRAM 10.

As discussed, the configuration tool 14 running at the client computer 4, the remote client manager utility 16 or the network station manager 6 can be used to access and modify configuration parameters, e.g., network, operating system, application, user configuration, and SNMP MIB configuration parameters, in the NVRAM 10. The management entities, i.e., configuration tool 14, network station manager 6 or SNMP agent 20 would perform the logic at steps 160 to 176 in FIG. 4 to determine whether they have permission to access and/or modify configuration parameters in the NVRAM 10. If a management entity initiates a read request (at block 160) for target configuration parameter(s), then the management entity determines (at block 162) whether the target configuration parameter(s) is a member of the set of configuration parameters 50$a$, $b$, $c$ associated with the token 52$a$ $b$, $c$ specifying the requesting management entity. Access may be granted for a particular application and/or particular machine identified by a network address or host name or password authentication. If the read request is permitted, then the requesting management entity accesses (at block 164) read access to the requesting entity. Otherwise a message indicating that access is denied is generated (at block 166).

If (at block 170) the access request is for a write operation to a target configuration parameter, then the requesting management entity determines (at block 172) whether the target configuration parameter is member of the set of configuration parameters 50$a$, $b$, $c$, associated with the access token 52$a$ $b$, $c$ for the requesting management entity. If so, then the requesting management entity performs (at block 174) the updates the target configuration parameters, which may include the access token settings 52$a$ $b$, $c$ or sets of configuration parameters 50$a$, $b$, $c$ associated with the access tokens stored in the NVRAM 10. Otherwise (at block 176), a message that access is denied is provided. After any changes are made to the configuration settings, the configuration tool 14 or client manager utility 16 would cause the client computer 2 to reboot and load the new settings.

With the logic of FIGS. 3 and 4, management entities at the local client computer 2 and a remote network station manager 6 can reconfigure configuration parameters. Further, the remote station manager 6 can determine which settings to allow only the network station manager 6 to control, such as certain network configuration parameters 50$a$ and the SNMP MIB parameters 50$e$. The network station manager 6 could further configure the access tokens 50$a$, $b$, $c$ to allow the user at the client computer 2 to configure operating system, application, and user interface 50$d$ configuration parameters.

Further, the setup utility 24 may load certain default sets of configuration parameters and token access rights 52$a$ $b$, $c$ into the NVRAM 10. For instance, the default configuration parameters may allow the network station manager 6 and SNMP manager 18 to modify network and SNMP MIB settings, respectively, but deny the client configuration tool 14 access to these parameters. Alternatively, certain parameters may by default be left to the client configuration tool 14. The initial shared arrangement can then be modified by the management entities having access rights to modify the sharing arrangements specified in the association of configuration parameter sets 50$a$, $b$, $c$ to management entity access tokens 52$a$ $b$, $c$. This would allow one application to modify the access tokens 52$a$ $b$, $c$ and/or configuration parameter sets 50$a$, $b$, $c$ to prevent another application from accessing configuration parameter. In this way, preferred embodiments provide a technique for allocating certain access and updating privileges for configuration parameters to remote network administrators and the local client user. Further, access may be restricted to particular applications running remotely or locally, e.g., the client manager utility 16 and configuration tool 14.

Following are some additional and alternative embodiments.

The preferred embodiments may be implemented as a method, apparatus or program using standard programming and/or engineering techniques to produce software, firmware, hardware, or any combination thereof. The program, code and instructions in which the preferred embodiments are implemented are accessible from and embedded in an information bearing medium, which may comprise one or more computer-readable devices, firmware, programmable logic, memory devices (e.g., EEPROMs, ROMs, PROMs, RAMs, SRAMs, etc.), hardware, electronic devices, a computer readable magnetic storage unit (e.g., CD-ROM, floppy disk, hard disk drive, etc.), a file server providing access to the programs via a network transmission line, wireless transmission media, signals propagating through space, radio waves, infrared signals, etc. Of course, those skilled in the art will recognize that many modifications may be made to this configuration without departing from the scope of the present invention.

In preferred embodiments, the configuration unit 8 was described as a compact flash card mounted on the motherboard of the client computer 2 or a PCMCIA card that is inserted in a PCMCIA port of the client computer 2. In alternative embodiments, the configuration unit 8 may be implemented as any removable non-volatile storage device known in the art, such as an insertable magnetic disk (e.g., floppy disk, the Iomega Corporation JAZ or ZIP disk, removable hard disk drive, etc.), a read/writable optical disk, such as a CD-ROM disk, etc.

In preferred embodiments, the tokens 52a b, c are associated with particular management entities and sets of configuration parameters 50a, b, c, such that the management entity can only access the set of configuration parameters associated with its token. In alternative embodiments, a token may be associated with a set of configuration parameters and not a management entity. In such case, the token indicates whether any entity can access the associated set of configuration parameters. Thus, before accessing the parameter, the management entity determines if the token for that parameter enables or denies access in general.

In preferred embodiments, the NVRAM 10 on the client computer 2 planar board stores the configuration parameters 50a, b, c. In alternative embodiments, other types of read/writable non-volatile storage medium (e.g., removable disk, read/writable CDROM, etc.) may be used to store the configuration parameters 50a, b, c and tokens 52a, b, c. Still further, the components stored in the configuration unit 8, such as the setup utility 24 and configuration toot 14, and the configuration parameters 50a, b, c may be stored in a same removable non-volatile storage medium. In such ease, the user can take the removable medium to different client computer 2 machines, and the different network machines would initialize the client computer using the configuration parameters 50a, b, c in the non-volatile storage medium. This would allow a user to work at any network computer using their particular settings. Such embodiments are particularly useful in network environments where users routinely work in different offices and locations.

Preferred embodiments were described with respect to a "thin" client computer 2 where the operating system and application programs are loaded from a remote server or configuration unit 8 upon each power on. However, in alternative embodiments, "fat" clients including an operating system and/or application programs installed on a hard disk drive could utilize the configuration technique of the preferred embodiments for providing configuration for certain parameters, such as network parameters 50a, user interface configuration 50d, SNMP MIB 50e, etc.

The sets of configuration parameters 50a, b, c described with respect to FIG. 2 is not intended to be exhaustive and there may be additional sets of configuration parameters, such as network resource configuration indicating printers and other devices to use, an authentication service to validate a user at the client computer 2, etc.

In further embodiments, the configuration tool 14 can be used to request an update of the programs 12 and 14 in the configuration unit 8 from a file maintained at a remote server over the network 4.

In still further embodiments, the client manager utility 16 may be invoked to simultaneously alter certain configuration parameters 50a, b, c in the NVRAMs 10 of multiple client computers 2.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of configuring a client computer connected to a network, wherein a remote computer is capable of communicating with the client computer over the network, comprising:

storing sets of configuration parameters in a non-volatile storage unit, wherein the sets of configuration parameters instruct at least one program how to initialize operational parameters and load programs into the client computer memory during a power on;

for each set of configuration parameters, storing a token in the non-volatile storage unit indicating access rights to the set of configuration parameters, wherein the token specifies whether management entities running on the remote computer and client computer can access the set of configuration parameters for that token, and wherein if the sets of configuration parameters are overlapping then a first management entity running on the remote computer and a second management entity running on the client computer can configure a same set of configuration parameters;

launching a configuration program from a removable storage unit interfaced with the client computer, wherein the configuration program is used to modify sets of configuration parameters in the non-volatile storage unit;

launching a setup program from the removable storage unit during a power on when the client computer has not previously been configured;

receiving settings for at least one set of configuration parameters via the setup program; and storing the received settings in the non-volatile storage unit, wherein the configuration program is launched to provide an interface to allow a user to set configuration parameters for other sets of configuration parameters.

2. The method of claim 1, wherein each token specifies at least one management entity, wherein only the management entity specified in the token has access rights to the set of configuration parameters associated with that token, wherein at least one token specifies one management entity at the client computer and at least one other token specifies one management entity at the remote computer.

3. The method of claim 1, wherein the at least one program is capable of comprising a boot program system or application program.

4. The method of claim 1, wherein the sets of configuration associated with the tokens include at least one of the following sets of configuration parameters:

network configuration parameters indicating network settings the client computer uses to communicate over the network;

operating system, configuration parameters for an operating system loaded into the client computer memory;

application configuration parameters indicating parameters for application programs loaded into the client computer memory;

user configuration parameters indicating settings for a user interface displayed at the client computer; and Simple Network Management Protocol (SNMP) configuration parameters.

5. The method of claim 1, further performing beginning an initialization routine after a power on event, wherein if the client computer was previously configured, during the initialization performing:

loading network configuration parameters stored in the non-volatile storage unit indicating a network address for the client computer to use; and loading operating system configuration parameters when loading an operating system kernel.

6. The method of claim 5, wherein the operating system is loaded from the removable storage unit interfacing with the client computer.

7. The method of claim 5, wherein the operating system configuration parameters indicate a remote server on the network including the operating system kernel, further comprising during the initialization:

downloading the operating system kernel from the remote server indicated in the operating system configuration parameters; and loading the downloaded operating system kernel into the client computer.

8. The method of claim 5, further comprising:

loading at least one application program indicated in the application configuration parameters into the memory of the client computer.

9. The method of claim 8, further comprising:

accessing the at least one application program from a remote server over the network or from the removable storage unit interfacing with the client computer, wherein the accessed at least one application program is loaded into the client computer memory.

10. The method of claim 1, wherein the token is a first type of token, and wherein the method further comprises:

storing a second type of token in the non volatile storage unit, wherein the second type of token indicates whether any management entity is allowed to access an associated set of configuration parameters, and wherein before accessing one of the associated set of configuration parameters a management entity determines if the second type of token for the one configuration parameter enables access in general.

11. A system for configuring a client computer connected to a network, wherein a remote computer is capable of communicating with the client computer over the network, comprising:

a non-volatile storage unit;

a processor capable of accessing the non-volatile storage unit;

a computer readable medium including program code accessible to the processor, wherein the processor executes the program code to perform;

(i) storing sets of configuration parameters in the non-volatile storage unit, wherein the sets of configuration parameters instruct at least one program how to initialize operational parameters and load programs into the client computer memory during a power on; and (ii) for each set of configuration parameters, storing a token in the non-volatile storage unit indicating access rights to the set of configuration parameters, wherein the token specifies whether management entities running on the remote computer and client computer can access the set of configuration parameters for that token, and wherein if the sets of configuration parameters are overlapping then a first management entity running on the remote compute and a second management entity running on the client computer can configure a same set of configuration parameters;

(iii) launching a configuration program from a removable storage unit interfaced with the client computer, wherein the configuration program is used to modify sets of configuration parameters in the non-volatile storage unit;

(iv) launching a setup program from the removable storage unit during a power on when the client computer has not previously been configured;

(v) receiving settings for at least one set of configuration parameters via the setup program; and (vi) storing the received settings in the non-volatile storage unit, wherein the configuration program is launched to provide an interface to allow a user to set configuration parameters for other sets of configuration parameters.

12. The system of claim 11, wherein each token specifics at least one management entity, wherein only the management entity specified in the token has access nights to the set of configuration parameters associated with that token, wherein at least one token specifies one management entity at the client computer and at the least one other token specifies one management entity at the remote computer.

13. The system of claim 11, wherein the at least one program code includes a boot program, operating system or application program.

14. The system of claim 11, wherein the sets of configuration associated with the tokens include at least one of the following sets of configuration parameters:

network configuration parameters indicating network settings the client computer uses to communicate over the network;

operating system configuration parameters for an operating system loaded into the client computer memory;

application configuration parameters indicating parameters for application programs loaded into the client computer memory;

user configuration parameters indicating settings for a user interface displayed at the client computer; and Simple Network Management Protocol (SNMP) configuration parameters.

15. The system of claim 11, wherein the program code is further capable of causing the client computer processor to perform beginning an initialization routine after a power on event, wherein if the client computer was previously configured, during the initialization performing:

loading network configuration parameters stored in the non-volatile storage unit indicating a network address for the client computer to use; and loading operating system configuration parameters when loading an operating system kernel.

16. The system of claim 15, wherein the operating system is loaded from the removable storage unit interfacing with the client computer.

17. The system of claim 15, wherein the operating system configuration parameters indicate a remote server on the network including the operating system kernel, further wherein the program code is further capable of causing the client computer processor to perform during the initialization:

downloading the operating system kernel from the remote server indicated in the operating system configuration parameters; and loading the downloaded operating system kernel into the client computer.

18. The system of claim 15, wherein the program code is further capable of causing the client computer processor to perform:

loading at least one application program indicated in the application configuration parameters into the memory of the client computer.

19. The system of claim 18, wherein the program code is further capable of causing the client computer processor to perform:

accessing the at least one application program from a remote server over the network or from the removable storage unit interfacing with the client computer, wherein the accessed at least one application program is loaded into the client computer memory.

20. The system of claim 11, wherein the token is a first type of token, and wherein the processor executes the program code to further perform:

storing a second type of token in the non volatile storage unit, wherein the second type of token indicates whether any management entity is allowed to access an associated set of configuration parameters, and wherein before accessing one of the associated set of configuration parameters a management entity determines if the second type of token for the one configuration parameter enables access in general.

21. A program of configuring a client computer connected to a network, wherein a remote computer is capable of communicating with the client computer over the network, wherein the program includes code embedded in a computer readable medium capable of causing a processor to perform:

storing sets of configuration parameters in a non-volatile storage unit, wherein the sets of configuration parameters instruct at least one program how to initialize operational parameters and load programs into the client computer memory during a power on; and for each set of configuration parameters, storing a token in the non-volatile storing unit indicating access rights to the set of configuration parameters, wherein the token specifies whether management entities running on the remote computer and client computer can access the set of configuration parameters for that token, and wherein if the sets of configuration parameters are overlapping then a first management entity running on the remote computer and a second management entity running on the client computer can configure a same set of configuration parameters;

launching a configuration program from a removable storage unit interface with the client computer, wherein the configuration program is used to modify sets of configuration parameters in the non-volatile storage unit;

launching a setup program from the removable storage unit during a power on when the client computer has not previously been configured;

receiving settings for at least one set of configuration parameters via the setup program; and storing the received settings in the non-volatile storage unit, wherein the configuration program is launched to provide an interface to allow a user to set configuration parameters for other sets of configuration parameters.

22. The program of claim 21, wherein each token specifies at least one management entity, wherein only the management entity specified in the token has access rights to the set of configuration parameters associated with that token, wherein at least one token specifies one management entity at the client computer and at least one other token specifies one management entity at the remote computer.

23. The program of claim 21, wherein the at least one program is capable of comprising a boot program, operating system or application program.

24. The program of claim 21, wherein the sets of configuration associated with the tokens include at least one of the following sets of configuration parameters:

network configuration parameters indicating network settings the client computer uses to communicate over the network;

operating system configuration parameters for an operating system loaded into the client computer memory;

application configuration parameters indicating parameters for application programs loaded into the client computer memory;

user configuration parameters indicating setting for a user interface displayed at the client computer; and Simple Network Management Protocol (SNMP) configuration parameters.

25. The program of claim 21, wherein the program code is further capable of causing the processor to perform beginning an initialization routine after a power on event, wherein if the client computer was previously configured, during the initialization performing:

loading network configuration parameters stored in tire non-volatile storage unit indicating a network address for the client computer to use; and loading operating system configuration parameters when loading an operating system kernel.

26. The program of claim 25, wherein the operating system is loaded from the removable storage unit interfacing with the client computer.

27. The program of claim 25, wherein the operating system configuration parameters indicate a remote server on the network including the operating system kernel, wherein the program code is further capable of causing the processor to perform;

downloading the operating system kernel from the remote server indicated in the operating system configuration parameters; and loading the downloaded operating system kernel into the client computer.

28. The program of claim 25, wherein the program code is further capable of causing the processor to perform:

loading at least one application program indicated in the application configuration parameters into the memory of the client computer.

29. The program of claim 28, wherein the program code is further capable of causing the processor to perform:

accessing the at least one application program from a remote server over the network or from the removable storage unit interfacing with the client computer, wherein the accessed at least one application program is loaded into the client computer memory.

30. The program of claim 21, wherein the token is a first type of token, and wherein the program is further capable of causing the processor to perform:

storing a second type of token in the nonvolatile storage unit, wherein the second type of token indicates whether any management entity is allowed to access an associated set of configuration parameters, and wherein before accessing one of the associated set of configuration parameters a management entity determines if the second type of token for the one configuration parameter enables access in general.

31. A method of configuring a client computer connected to a network, wherein a remote computer is capable of communicating with the client computer over the network, comprising:

storing sets of configuration parameters in a non-volatile storage unit, wherein the sets of configuration parameters instruct at least one program how to initialize operational parameters and load programs into the client computer memory during a power on;

for each set of configuration parameters, storing a token in the non-volatile storage unit indicating access rights to the set of configuration parameters, wherein the token specifies whether management entities running on the remote computer and client computer can access the set of configuration parameters for that token, and wherein if the sets of configuration parameters are overlapping then a first management entity running on the remote computer and a second management entity running on the client computer can configure a same set of configuration parameters, wherein each token specifies at least one management entity, wherein only the management entity specified in the token has access rights to the set of configuration parameters associated with that token, wherein at least one token specifies one management entity at the client computer and at least one other token specifies one management entity at the remote computer, and wherein a first user at the client computer and a second user at the remote computer are both capable of changing access settings indicated in the token to exclude other users from access to corresponding configuration parameters of the token.

32. The method of claim 31, wherein the client computer and remote computer are capable of modifying the access rights specified in the token if the access rights permit the client computer or remote computer requesting the modification write access to the set of configuration parameters, further comprising:

storing modifications in the non-volatile storage unit from the client computer or remote computer to the access rights specified in the token for one set of configuration parameters, wherein the modifications are made to the token if the client computer or remote computer initiating the modifications is indicated in the access writes as having write access.

33. The method of claim 32, wherein the access rights in one token specify one application program in the remote computer or client program that can modify the set of configuration parameters.

34. The method of claim 31, further comprising:

launching a configuration program from a removable storage unit interfaced with the client computer, wherein the configuration program is used to modify sets of configuration parameters in the non-volatile storage unit.

35. The method of claim 31, further comprising:

launching a setup program from a removable storage unit during a power on when the client computer has not previously been configured;

receiving settings for network configuration parameters indicating a network address for the client computer through the setup program;

receiving operating system configuration parameters for an operating system kernel to load into the client computer memory through the setup program; and storing the network and operating system configuration parameters received through the setup program in the non-volatile storage unit.

36. The method of claim 35, further comprising launching a configuration program from the setup program to receive application configuration parameters for application programs to load into the client computer memory and user interface configuration parameters.

37. A system for configuring a client computer connected to a network, wherein a remote computer is capable of communicating with the client computer over the network, comprising:

a non-volatile storage unit;

a processor capable of accessing the non-volatile storage unit;

a computer readable medium including program code accessible to the processor, wherein the processor executes the program code to perform;

(i) storing sets of configuration parameters in the non-volatile storage unit, wherein the sets of configuration parameters instruct at least one program how to initialize operational parameters and load programs into the client computer memory during a power on; and (ii) for each set of configuration parameters, storing a token in the non-volatile storage unit indicating access rights to the set of configuration parameters, wherein the token specifies whether management entities running on the remote computer and client computer can access the set of configuration parameters for that token, and wherein if the sets of configuration parameters are overlapping then a first management entity running on the remote computer and a second management entity running on the client computer can configure a same set of configuration parameters, wherein each token specifies at least one management entity, wherein only the management entity specified in the token has access rights to the set of configuration parameters associated with that token, wherein at least one token specifies one management entity at the client computer and at least one other token specifies one management entity at the remote computer, and wherein a first user at the client computer and a second user at the remote computer are both capable of changing access settings indicated in the token to exclude other users from access to corresponding configuration parameters of the token.

38. The system of claim 37, wherein the client computer and remote computer are capable of modifying the access rights specified in the token if the access rights permit the client computer or remote computer requesting the modification write access to the set of configuration parameters, wherein the program code is further capable of causing the client computer processor to perform:

storing modifications in the non-volatile storage unit from the client computer or remote computer to the access rights specified in the token for one set of configuration parameters, wherein the modifications are made to the token if the client computer or remote computer initiating the modifications is indicated in the access writes as having write access.

39. The system of claim 38, wherein the access rights in one token specify one application program in the remote computer or client program that can modify the set of configuration parameters.

40. The system of claim 37, wherein the program code is further capable of causing the client computer processor to perform:

launching a configuration program from a removable storage unit interfaced with the client computer, wherein the configuration program is used to modify sets of configuration parameters in the non-volatile storage unit.

41. The system of claim 37, wherein the program code is further capable of causing the client computer processor to perform:

launching a setup program from a removable storage unit during a power on when the client computer has not previously been configured;

receiving settings for network configuration parameters indicating a network address for the client computer through the setup program;

receiving operating system configuration parameters for an operating system kernel to load into the client computer memory through the setup program; and storing the network and operating system configuration parameters received through the setup program in the non-volatile storage unit.

42. The system of claim 41, wherein the program code is further capable of causing the client computer processor to perform launching a configuration program from the setup program to receive application configuration parameters for application programs to load into the client computer memory and user interface configuration parameters.

43. A program of configuring a client computer connected to a network, wherein a remote computer is capable of communicating with the client computer over the network, wherein the program includes code embedded in a computer readable medium capable of causing a processor to perform:

storing sets of configuration parameters in a non-volatile storage unit, wherein the sets of configuration parameters instruct at least one program how to initialize operational parameters and load programs into the client computer memory during a power on; and for each set of configuration parameters, storing a token in the non-volatile storage unit indicating access rights to the set of configuration parameters, wherein the token specifies whether management entities running on the remote computer and client computer can access the set of configuration parameters for that token, and wherein if the sets of configuration parameters are overlapping then a first management entity running on the remote computer and a second management entity running on the client computer can configure a same set of configuration parameters, wherein each token specifies at least one management entity, wherein only the management entity specified in the token has access rights to the set of configuration parameters associated with that token, wherein at least one token specifies one management entity at the client computer and at least one other token specifies one management entity at the remote computer, and wherein a first user at the client computer and a second user at the remote computer are both capable of changing access settings indicated in the token to exclude other users from access to corresponding configuration parameters of the token.

44. The program of claim 43, wherein the client computer and remote computer are capable of modifying the access rights specified in the token if the access rights permit the client computer or remote computer requesting the modification write access to the set of configuration parameters, wherein the program code is further capable of causing the processor to perform:

storing modifications in the non-volatile storage unit from the client computer or remote computer to the access rights specified in the token for one set of configuration parameters, wherein the modifications are made to the token if the client computer or remote computer initiating the modifications is indicated in the access writes as having write access.

45. The program of claim 44, wherein the access rights in one token specify one application program in the remote computer or client program that can modify the set of configuration parameters.

46. The program of claim 43, wherein the program code is further capable of causing the processor to perform:

launching a configuration program from a removable storage unit interfaced with the client computer, wherein the configuration program is used to modify sets of configuration parameters in the non-volatile storage unit.

47. The program of claim 43, wherein the program code is further capable of causing the processor to perform:

launching a setup program from a removable storage unit during a power on when the client computer has not previously been configured;

receiving settings for network configuration parameters indicating a network address for the client computer through the setup program;

receiving operating system configuration parameters for an operating system kernel to load into the client computer memory through the setup program; and storing the network and operating system configuration parameters received through the setup program in the non-volatile storage unit.

48. The program of claim 47, wherein the program code is further capable of causing the processor to perform launching a configuration program from the setup program to receive application configuration parameters for application programs to load into the client computer memory and user interface configuration parameters.

* * * * *